United States Patent [19]
Hirano et al.

[11] Patent Number: 5,105,210
[45] Date of Patent: Apr. 14, 1992

[54] INK JET RECORDING APPARATUS EXPANDABLE TO ACCOMMODATE VARIABLE SHEET WIDTHS

[75] Inventors: Hirofumi Hirano, Yokohama; Makoto Kashimura, Tokyo; Katsuyuki Yokoi; Takashi Akiya, both of Yokohama; Jun Katayanagi, Musashino; Tetsuo Kimura, Sagamihara, all of Japan

[73] Assignee: Canon Kabushiki Kaisha, Tokyo, Japan

[21] Appl. No.: 353,000

[22] Filed: May 17, 1989

[51] Int. Cl.⁵ .............................. B41J 2/05; B41J 11/56
[52] U.S. Cl. ..................... 346/145; 346/140 R; 400/680; 400/126
[58] Field of Search ............. 346/145, 134, 140 R; 400/352, 354, 680, 685, 691, 692, 693

[56] References Cited

U.S. PATENT DOCUMENTS

| | | | |
|---|---|---|---|
| 2,804,188 | 8/1954 | Brace | 400/352 |
| 4,562,444 | 12/1985 | Nagashima | 346/145 |
| 4,673,956 | 6/1987 | Kobayashi | 346/145 |
| 4,692,778 | 9/1987 | Yoshimura | 346/145 |
| 4,750,047 | 6/1988 | Kotani | 346/145 |

FOREIGN PATENT DOCUMENTS

| | | | |
|---|---|---|---|
| 27458 | 2/1983 | Japan | 358/449 |
| 299373 | 12/1987 | Japan | 400/691 |
| 139774 | 6/1988 | Japan | 400/691 |

Primary Examiner—Benjamin R. Fuller
Assistant Examiner—Scott A. Rogers
Attorney, Agent, or Firm—Fitzpatrick, Cella, Harper & Scinto

[57] ABSTRACT

A recording apparatus for effecting recording on a recording medium has a recording head for effecting recording on the recording medium, conveying rollers for conveying the recording medium, a first and a second case for covering the recording head and the conveying means, and a mechanism for effecting relative movement of the first case and the second case.

36 Claims, 15 Drawing Sheets

INK JET RECORDING APPARATUS EXPANDABLE TO ACCOMMODATE VARIABLE SHEET WIDTHS

BACKGROUND OF THE INVENTION

1. Field of the Invention

This invention relates to a recording apparatus for effecting recording on a recording medium such as a recording sheet.

The present invention can be suitably applied to a recording apparatus such as a printer or a facsimile apparatus in which a recording head is carried on a carrier reciprocally movable in the widthwise direction of a recording medium and recording is effected while main scanning is effected in a direction perpendicular to the direction of feeding of the recording medium.

2. Related Background Art

A serial recording apparatus will hereinafter be described as an example.

The prior-art serial recording apparatus is of such structure that a guide shaft for guiding a carrier is fixed between the right and left frame members of the apparatus body and the shafts of a sheet feeding roller for conveying a recording sheet and a guide roller are rotatably supported, and the range of movement of said carrier and the lengths of said rollers are set to dimensions which cover the greatest recordable sheet width.

Now, the determination of the greatest recordable sheet width is done with that sheet width taken into account though it may be used rarely, and therefore, the greatest recordable sheet width is generally much greater than the sheet width used usually.

Therefore, the widthwise dimension of the recording apparatus also generally becomes greater than necessary when viewed from its daily use.

However, the intermediate portion in the widthwise direction of the serial recording apparatus is merely a space for securing the movement distance of the carrier and therefore, the use of a recording apparatus of great width which takes into account recording sheets only rarely used as previously mentioned has led to the possibility of the apparatus becoming uneconomical in terms of space.

SUMMARY OF THE INVENTION

It is an object of the present invention to provide a recording apparatus having a variable size apparatus body.

It is another object of the present invention to provide a recording apparatus for which the custody space during non-use can be made small.

It is still another object of the present invention to provide a recording apparatus in which the size of the apparatus body can be varied in accordance with the size of a recording medium on which recording is to be effected, thereby achieving high efficiency of the installation space for the apparatus during use.

It is yet still another object of the present invention to provide an ink jet recording apparatus in which the possibility of the apparatus being left without the recording head thereof being capped during non-use or custody can be prevented and the smoothness of starting of the apparatus during re-use is realized.

It is a further object of the present invention to provide a recording apparatus in which the widthwise dimension of the apparatus body is detected and the range of reciprocal movement of recording means is determined in conformity with the result of the detection.

DESCRIPTION OF THE PREFERRED EMBODIMENTS

The present invention will hereinafter be described specifically with reference to the drawings.

Figure 1:
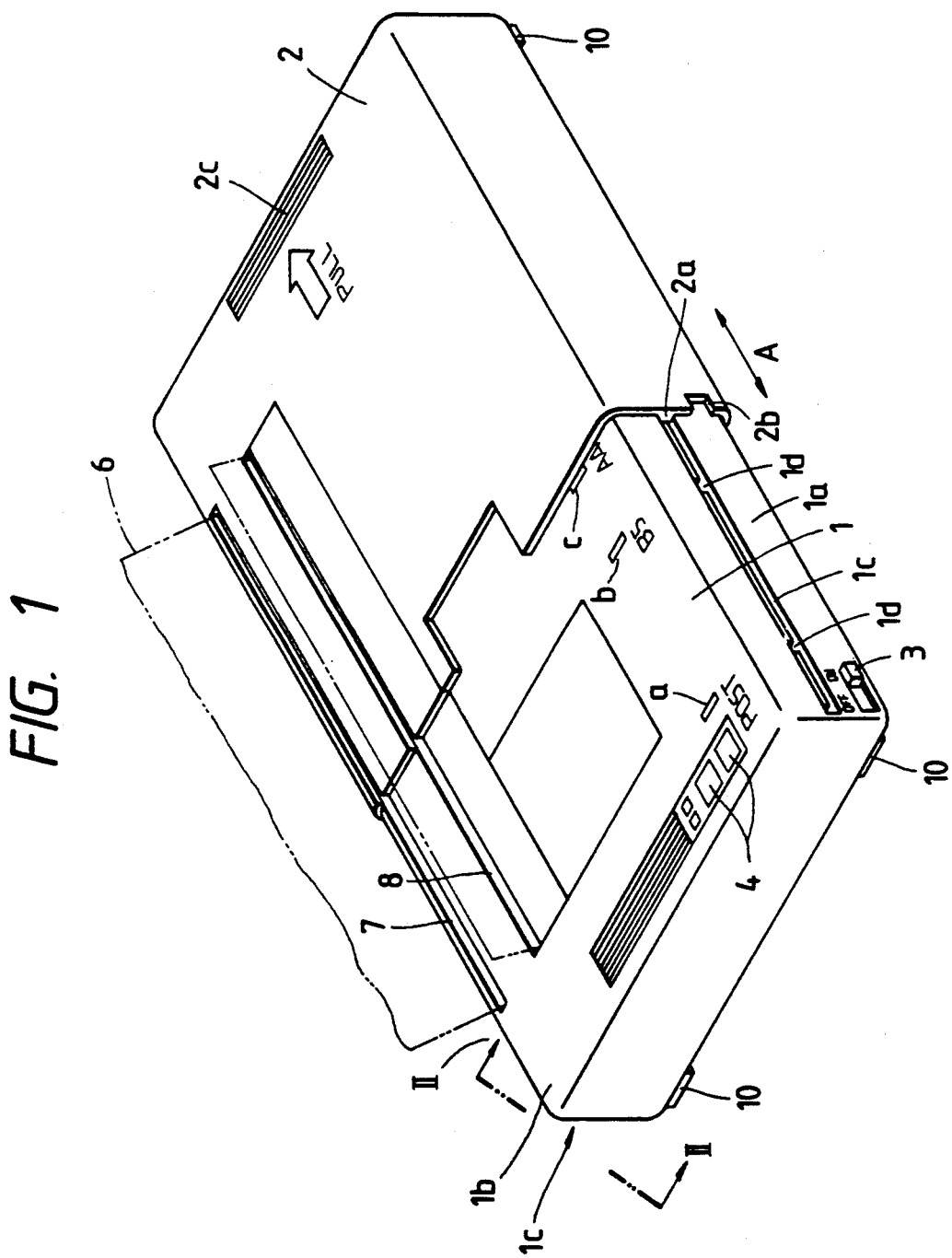
FIG. 1 is a perspective view showing a state in which a serial recording apparatus according to an embodiment of the present invention is used.
Figure 2:
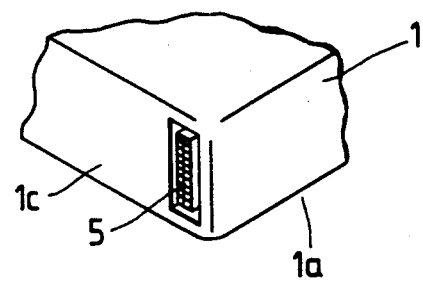
FIG. 2 is a fragmentary perspective view taken along line II—II in FIG. 1.
Figure 3:
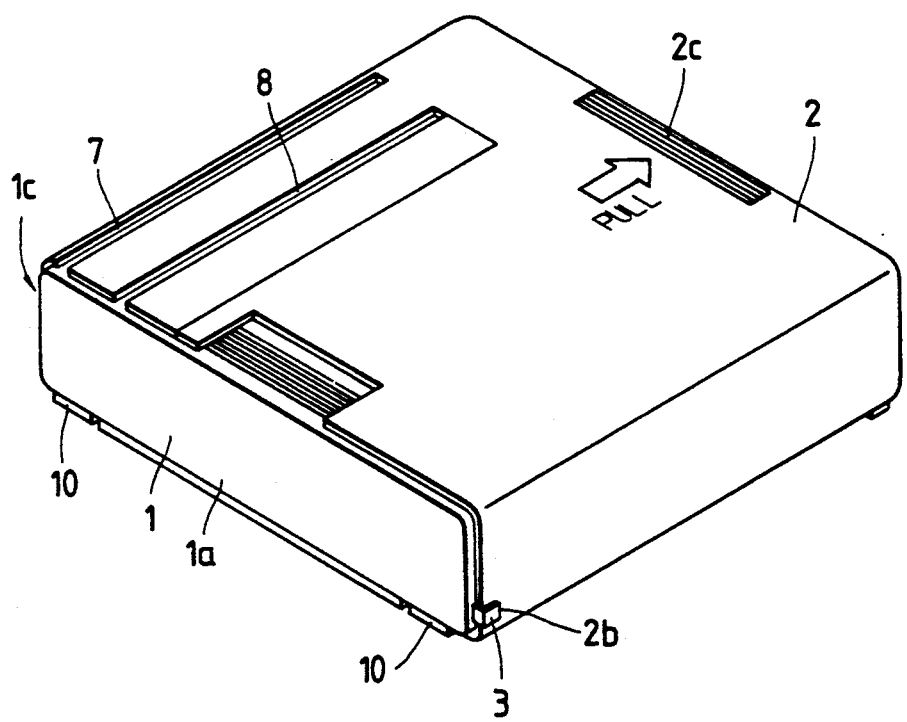
FIG. 3 is a perspective view showing the recording apparatus of FIG. 1 as it is contained.

FIG. 1 is a perspective view showing a state in which an embodiment of a serial recording apparatus capable of expansion and contraction in its widthwise direction is used, FIG. 2 is a fragmentary view taken along line II—II of FIG. 1, and FIG. 3 is a perspective view of the recording apparatus of FIG. 1 as it is reduced (contained).

Referring to FIGS. 1-3, the serial recording apparatus shown is designed such that cases 1 and 2 and a recording mechanism therein can be expanded or contracted in the direction of movement of a carrier (the direction of arrow A) to thereby increase or decrease the widthwise dimension of the apparatus and when the apparatus is to be contained, it can be reduced to its minimum width as shown in FIG. 3.

The cases are of such structure that the outer surface of a half 1 of the apparatus body provided with a main switch (a power source switch) 3, various touch switches 4 (such as for setting the size, setting the number of sheets and setting the density) and an interface connector 5 for connection to an outside input instrument such as a personal computer has another half 2 of the apparatus body on the cover side thereof slidably fitted thereto. The cases are also of such structure that the widthwise dimension thereof can be freely selected by being held by click action at a plurality of positions conforming to the widths of recording sheets 6 used, such as not only the position for the paper size A4 shown, but also positions of small widths for size B5 and postcard size and positions of great widths for sizes B4 and A3.

That is, in the present embodiment, the outer case of the apparatus body is divided into two, a convex portion 2a provided on the case 2 is brought into engagement with a concave rail 1C provided on the front side plate 1a of the case 1 and the case 2 is made slidable relative to the case 1. The convex portion 2a is formed of an elastic material such as plastic, and by this convex portion 2a fitting to one of cut-aways 1d in the rail 1c provided in conformity with the various sizes of recording sheets, the case 2 can be fixed by click action. On the case 1, the main switch 3 is provided projecting from the front side plate 1a, and the touch switches 4 are provided in the recess of the upper surface 1b of the case 1c, and further, size indicating portions a, b and c are provided on the upper surface 1b. Also on the case 2, a cut-away 2b is provided at a location opposed to the main switch 3, and a handle portion 2c for use when the case 2 is to be slid is provided.

When the apparatus is not being used, as shown in FIG. 3, the cases 1 and 2 may be pushed into each other and be held at the position of the minimum width (the containment width) by click action.

Further, in the upper surface 1b of the cases 1 and 2, a slit-like insertion port 7 for inserting therethrough the recording sheet 6 for effecting recording thereon and a discharge port 8 for discharging therethrough the recording sheet 6 after recording are formed astride the two cases 1 and 2. The lengths of the insertion port 7 and discharge port 8 are variable in conformity with the widthwise dimension of the cases 1 and 2 and are set to a value suitable for the insertion of the recording sheet 6 used.

As is apparent from FIGS. 1 and 3, in the state in which the widthwise dimension of the recording apparatus has been made minimum with the cases 1 and 2 sufficiently pushed into each other (FIG. 3), the interface connector 5 for connection to the outside input such as a personal computer which is provided in the recess of the rear side surface 1c of the case 1 of the apparatus body side and the switches 4 are fully covered with the case 2 of the cover side so that no dust enters the interior of the recording apparatus. A recess may be provided in the inner surface of the case 2 so that the switches 4 may project from the upper surface of the case 1.

In this manner, a protective cover for the connector 5 and the switches 4 is formed by the cases 1 and 2 themselves which are fitted together for expansion and contraction, and a dust-proof structure is constructed which prevents the entry of dust from the switches and connection into a control circuit or the like in the apparatus without requiring any additional parts.

Also, the main switch 3 mounted on the side surface 1a of the case 1 of the apparatus body side is disposed so that the power source of the entire apparatus is switched OFF by the cut-away 2b of the case 2 coming into engagement with the switch 3 in response to the movement of the case 2 in the direction of closing to thereby move the switch 3 to its OFF position when the widthwise dimension of the recording apparatus (the cases 1 and 2) reaches its minimum or the vicinity thereof. Thus, after the completion of printing, the main switch 3 can be reliably opened simply by containment, and the problem of forgetting to cut off the power source can be eliminated.

Further, pedestals 10 of rubber-like elastic material are attached to the bottom surfaces of the cases 1 and 2, and the pedestals 10 attached to the apparatus body side function as stopper for regulating the minimum width (the containment width) when the cases 1 and 2 are fitted together into their smallest size as shown in FIG. 3.

Figure 4:
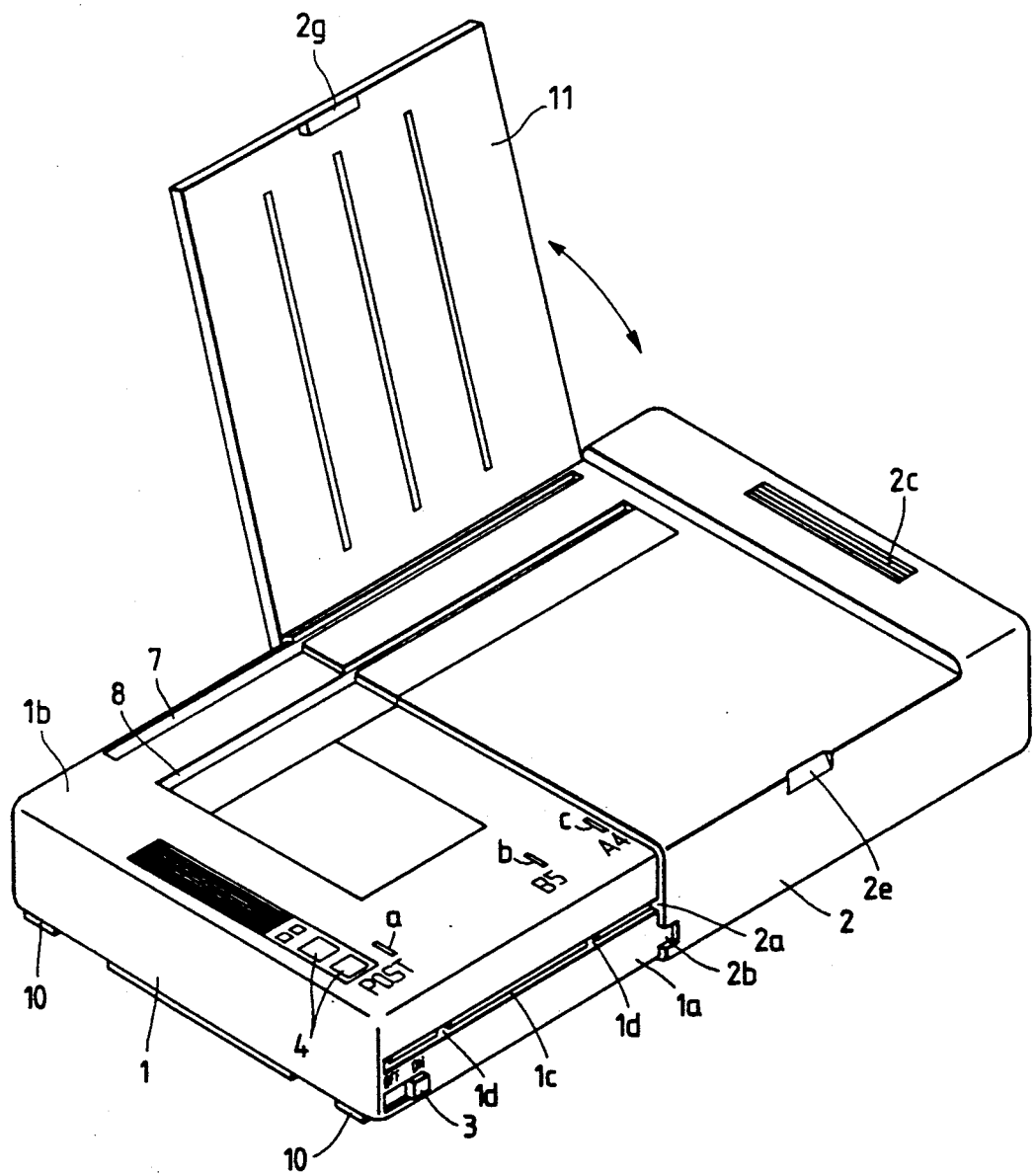
FIG. 4 is a perspective view of a serial recording apparatus according to another embodiment of the present invention.
Figure 5:
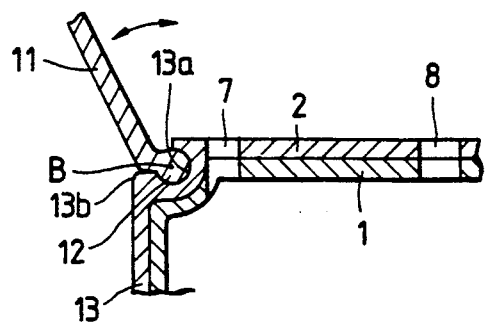
FIG. 5 is a cross-sectional view of the pivotally connected portion of a plate member in FIG. 4.
Figure 6:
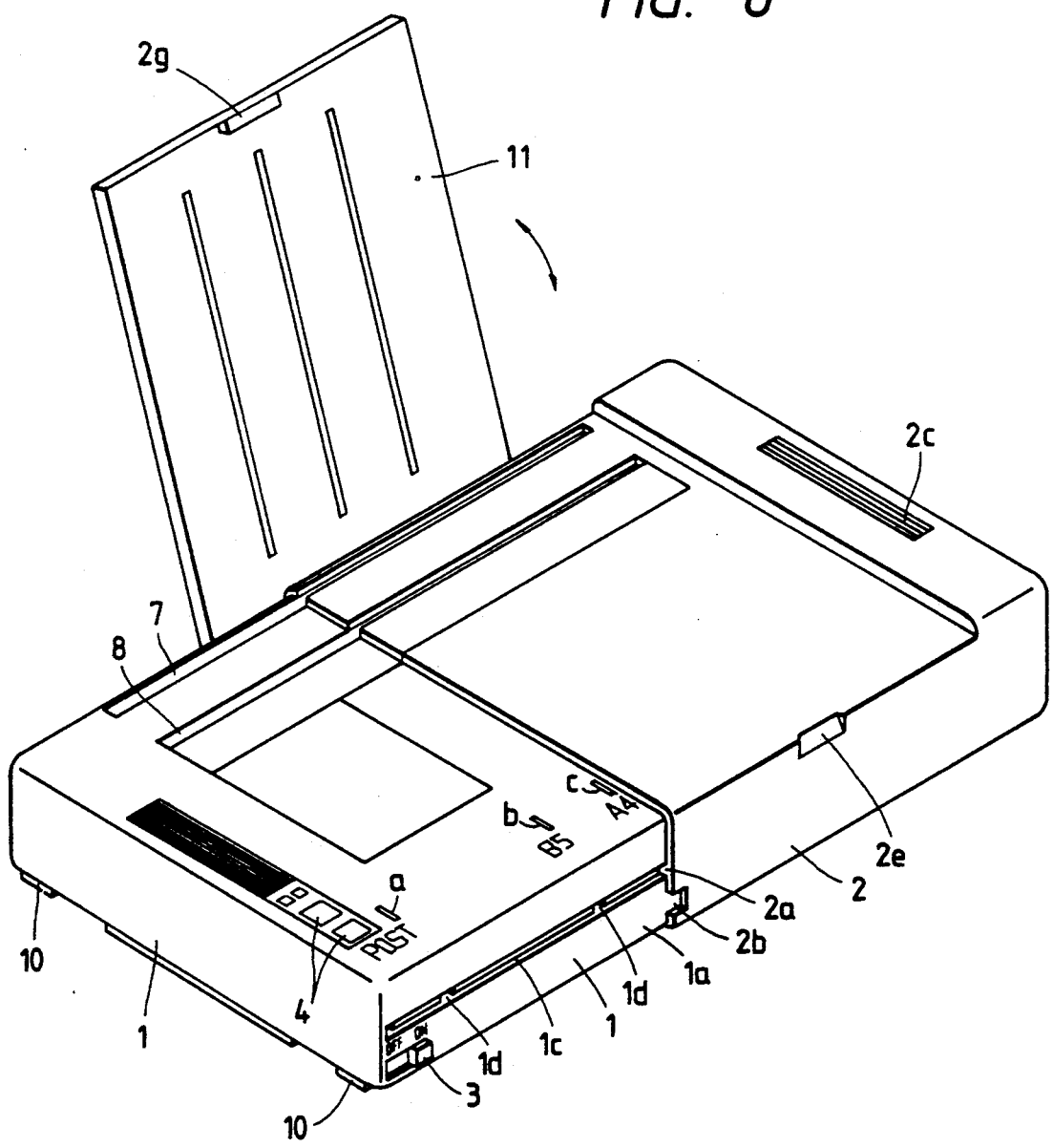
FIG. 6 is a perspective view showing a state in which the recording apparatus of FIG. 4 is used.
Figure 7:
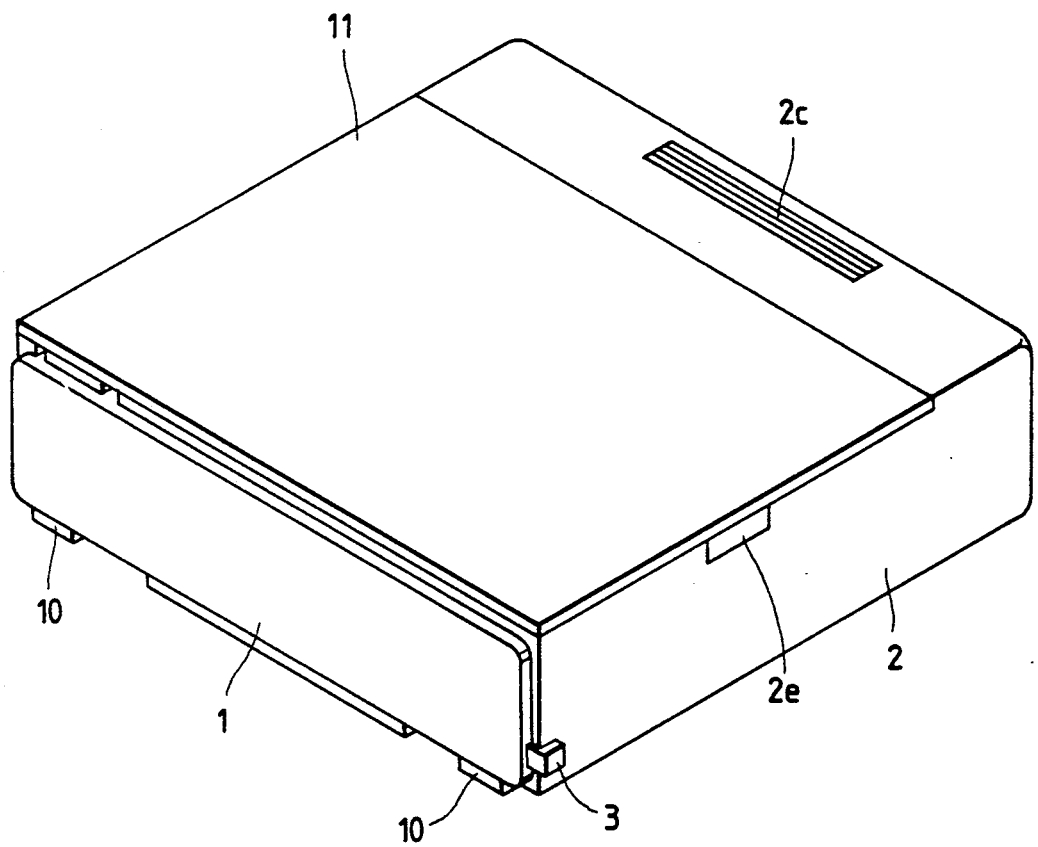
FIG. 7 is a perspective view showing the recording apparatus of FIG. 5 as it is contained.

FIG. 4 is a perspective view of another embodiment of the serial recording apparatus capable of expansion and contraction, FIG. 5 is a cross-sectional view of the pivotally connected portion of a plate member in FIG. 4, FIG. 6 is a perspective view showing a state in which the recording apparatus of FIG. 4 is used, and FIG. 7 is a perspective view showing a state in which the recording apparatus of FIG. 4 is in non-use (in custody or contained).

The embodiment of FIGS. 4-7, like the embodiment of FIGS. 1-3, is designed such that the widthwise dimension of the apparatus is increased or decreased by the cases 1 and 2 and a recording mechanism therein (see FIG. 8) being expanded or contracted in the direction of movement of the carrier.

The present embodiment is of such structure that a plate member (opening-closing member) 11 is mounted on the cases 1 and 2 for pivotal movement about a horizontal axis B and sliding movement in a horizontal direction by a mechanism which will be described later and the plate member 11 is erected to bring about a state of use (an opened state) shown in FIG. 6, whereby there is constituted a sheet support for holding the recording sheet 6 to be inserted into the insertion port 7 or to be discharged from the discharge port 8, and by the cases 1 and 2 being brought into the minimum width (contained) state and the plate member 11 being brought down (onto the upper surface 1b of the case 1) as shown in FIG. 7, there is formed a cover on the cases 1 and 2. Designated by 2e is a lock member adapted to be engaged with a restraining portion 2g for the plate member 11 to thereby maintain the plate member 11 unlocked.

Now, the opening-closing mechanism of the plate member 11 is mounted for sliding movement in the widthwise direction of the cases 1 and 2 and pivotal movement about the axis B by a bead portion (shaft portion) 12 being pivotally fitted into a circular groove 13 provided in a base 13 formed astride the cases 1 and 2 and along the sheet insertion port 7 in the cases 1 and 2 integral with the plate member 11, as shown in FIG. 5. The plate member 11 is maintained in its opened state by the rear surface 11a thereof being caused to bear against the upper surface 13b of the base 13.

FIG. 4 shows a state in which the plate member 11 is erected (opened) and the cases 1 and 2 are extended to a predetermined width (size A4). In the state of use (the opened state) of the plate member 11 shown in FIG. 6, the plate member 11 is slid to the central position of the sheet insertion port 7 and is set at a position whereat the recording sheet (not shown) can be held with good balance and thus, a sheet supporter is constituted.

The fitting of the spherical edge portion 12 of the plate member 11 into the groove 13 in the cases 1 and 2 can be accomplished by the operator manually sliding the plate member 11, but it is preferable to adopt tight fitting which can hold the spherical edge portion at any position by a frictional force, and in some cases, it is also possible to adopt a structure for holding the spherical edge portion at a position corresponding to the sheet size by click action.

As described above, the serial recording apparatus capable of expansion and contraction shown in FIGS. 4-7 differs from the embodiment of FIGS. 1-3 in that there is added the collapsible plate member 11 which functions as a sheet supporter during use and functions as a cover during non-use, and in the other points, it is substantially similar to the embodiment of FIGS. 1-3.

Accordingly, in the embodiment shown in FIGS. 4-7, portions similar to those in FIGS. 1-3 are given similar reference numerals and need not be described.

According to the case structure shown in FIGS. 4-7, the same effect as that of the embodiment shown in FIGS. 1-3 is obtained and in addition, the provision of the plate member 11 can lead to the provision of a mechanism which serves both as a sheet supporter and a cover by a simple and compact construction.

Figure 8:
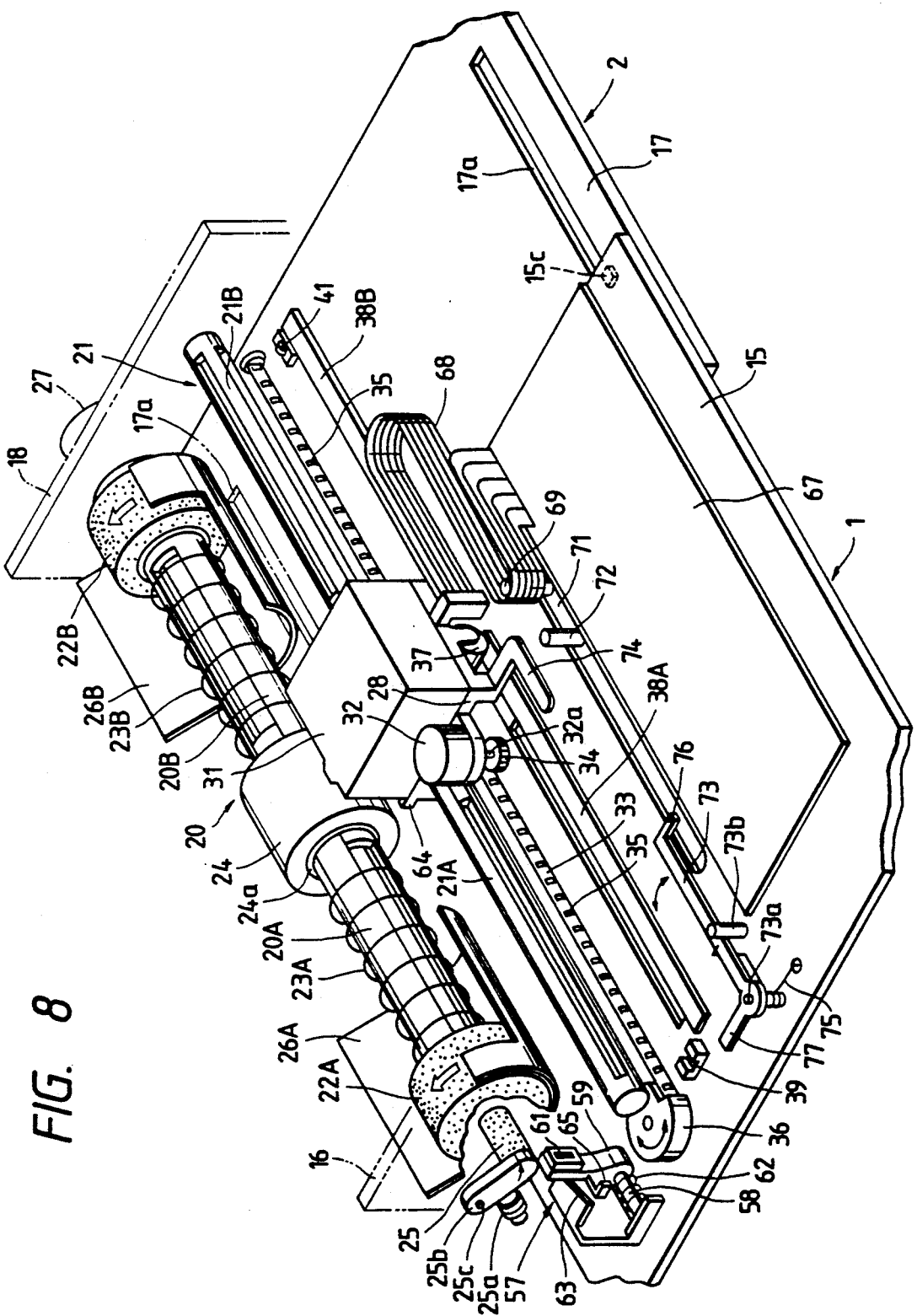
FIG. 8 is a perspective view showing the internal structure of the recording apparatus according to the present invention.

Now, FIG. 8 is a perspective view showing the internal structure of the serial recording apparatus capable of expansion and contraction according to the present invention, and the structure of FIG. 8 is incorporated in the interior of the cases 1 and 2 described with reference to FIGS. 1-7.

In FIG. 8, a left base 15 and a left side plate 16 are fixed to one case 1, and a right base 17 and a right side plate 18 are fixed to the other case 2. Accordingly, the left base 15 and the left side plate 16 and the right base 17 and the right side plate 18 move relative to one another in the direction of movement of the carrier with the expansion or contraction of the cases 1 and 2, and the recording mechanism supported therebetween expands and contracts. Two grooves 17a are formed in the base 17 along the direction of sliding, and a dowel 15a is provided on the bottom surface of the base 15. So, during the sliding of the cases 1 and 2, the dowel 15a comes into engagement with the grooves 17a and moves therein and therefore, the sliding of the cases 1 and 2 is accomplished well.

First, a feed roller shaft 20 capable of expansion and contraction is rotatably journalled to the left and right side plates 16 and 18. A guide shaft 21 capable of expansion and contraction is fixed forwardly of and parallel to the feed roller shaft 20. Sheet feed driving rollers 22A and 22B made of hard rubber or like material are fixed to the opposite end portions of the feed roller shaft 20, i.e., the immediate inner portions of the side plates 16 and 18. The sheet feed driving rollers 22A and 22B are driven by a sheet feed motor 27 through the shaft 20.

Here, the feed roller shaft 20 and the guide shaft 21 are designed to expand or contract freely in conformity with the increase or decrease in the spacing between the side plates 16 and 18 caused by the expansion or contraction of the cases 1 and 2.

The expansion and contraction of the feed roller shaft 20 and the guide shaft 21 will now be described.

Figure 9:
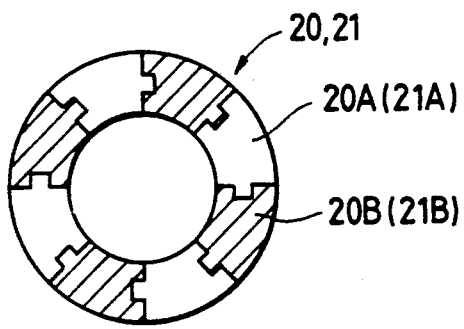
FIG. 9 is a cross-sectional view of the inserted and fitted portion of a guide shaft in FIG. 8.
Figure 10:
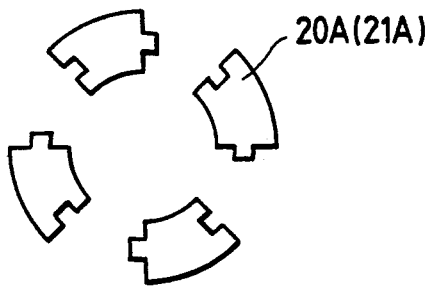
FIG. 10 is a cross-sectional view of a half portion of the shaft of FIG. 9.

FIG. 9 shows a cross-section of the expansible and contractible slide fitting portion of the feed roller shaft 20 and the guide shaft 21, and FIG. 10 shows a cross-section of one of the shafts of FIG. 9.

That is, the feed roller shaft 20 and the guide shaft 21 are of two-division structure in which they are slidably connected together by an axial dovetail groove, and the left and right halves 20A (21A) and 20B (21B) thereof are of a partly arcuate cross-sectional shape in which the fitting portions for receiving the partners are cut away. The left and right shaft portions 20A (21A) and 20B (21B) are slidably fitted to each other, and further, a guide roller 24 for supporting the intermediate portion of the sheet 6 (FIG. 1) conveyed by rollers 22A and 22B is slidably fitted to the outer periphery of the intermediate portion of the shaft 20. That is, the inner diameter 24a of the roller 24 is made slightly greater than the outer diameter of the shaft 20, and the roller 24 is provided for sliding movement along the shaft 20 and for idle rotation.

Further, compression springs 23A and 23B of equal resilient forces fitted to the shaft 20 are mounted between the opposite end surfaces of the guide roller 24 and the inner end surfaces of the left and right feed rollers 22A and 22B. Thus, the guide roller 24 is subjected to the equal spring forces of the springs 23A and 23B from the opposite sides thereof even when the shaft 20 expands or contracts, whereby it is resiliently held at a predetermined position (usually the substantially central position) on the shaft 20.

Furthermore, pinch rollers 25 (only the left one of which is shown) are adapted to be urged against the recording sheet entrance side of the left and right feed rollers 22A and 22B by a spring force. That is, the pinch rollers 25 are biased by a compression spring 25a and held by a lever 25b pivotable about a shaft 25c to thereby press the rollers 22A and 22B. Still further, paper pans 26A and 26B which form a predetermined gap between the peripheral surfaces of the left and right feed rollers 22A and 22B and function as a sheet keeper and a sheet guide are fixed along said peripheral surfaces.

According to the above-described sheet feeding mechanism, the spacings between the left and right sheet feed rollers 22A and 22B, between the left and right sheet keepers 26A and 26B and between the left and right pinch rollers 25 can be increased or decreased in conformity with the sheet width and therefore, independently of the sheet width, a sheet feeding force can always be imparted to the widthwisely opposite end portions of the sheet 6 and thus, smooth and accurate sheet feeding without any skew feeding can be accomplished.

In the aforedescribed embodiment, there has been shown an example in which the guide roller 24 is provided for idle rotation on the shaft 20, but alternatively, the guide roller 24 may be constructed so as to be restrained on the shaft 20 so that a driving force may be imparted to the guide roller 24. In such case, an elongated groove is formed in the shaft 20 along the direction of sliding, and a dowel is provided on the inner surface of the roller 24. In this manner, the dowel is brought into engagement with said groove, whereby the roller 24 is rotatively driven in accordance with the rotation of the shaft 20 and the roller 24 is slidable in the thrust direction. Such a construction is particularly effective for the conveyance of recording sheets of small sizes.

Also, a carrier 28 is slidably supported on the guide shaft 21. A recording head 31 is carried on the carrier 28. Here, the recording head 31 shows the case of an ink jet recording head with an ink tank, and the front face of the head 31 is provided with a plurality of ink discharge ports (not shown) for forming flying ink droplets by the action of electro-thermal converting elements driven in accordance with image information. Accordingly, the ink droplets are of the so-called impact type which flies from the discharge ports toward the recording sheet 6 to thereby accomplish recording.

The guide shaft 21, like the feed roller shaft 20, is of two-division structure in which the left and right halves are slidably connected together by an axial dovetail groove, and the left and right halves 21A and 21B are of a partly arcuate cross-sectional shape in which the fitting portions for receiving the partners are cut away as shown in FIG. 10.

Thus, the guide shaft 21 also is constructed for expansion and contraction with the cases 1 and 2, in conformity with the widthwise expansion and contraction of the apparatus.

The guide shaft 21 needs to guide the carrier 28 accurately and therefore, needs to have a cross-sectional shape which will not cause steps, as shown in FIGS. 9 and 10, but the feed roller shaft 20 will be sufficient if connected so as to be capable of transmitting the rotational force, and may cause steps to be formed on the intermediate portion thereof.

Figure 11A:
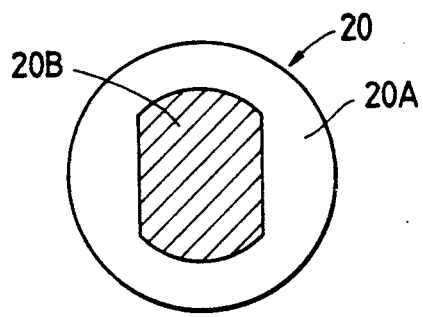
FIG. 11A is a cross-sectional view of another form of a feed roller shaft in FIG. 8.
Figure 11B:
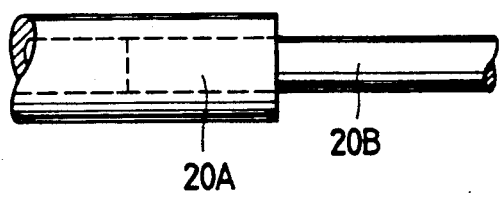
FIG. 11B is a side view thereof.

Now, FIGS. 11A and 11B show a cross-sectional view and a side view, respectively, of the connecting portion of another embodiment of the feed roller shaft 20.

As shown, one half 20A and the other half 20B of the shaft 20 may be of a stepped shape similar to that of a square plunger, a square cylinder or the like.

Figure 12:
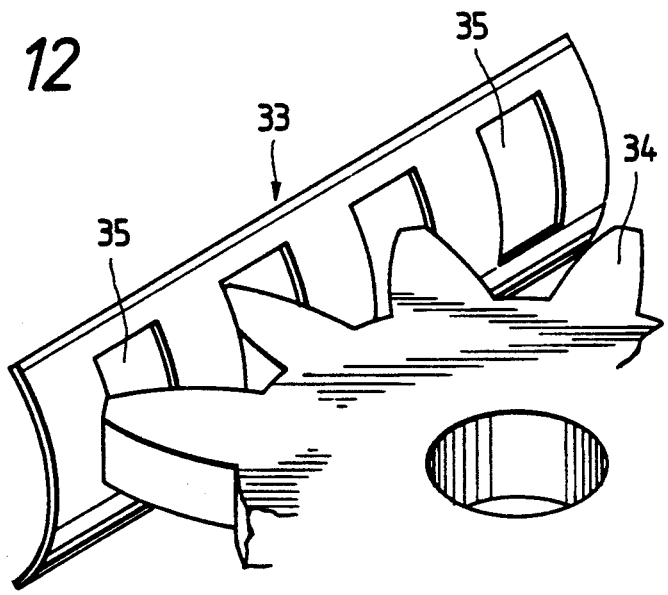
FIG. 12 is a fragmentary perspective view of a rack for driving a carrier in FIG. 8.

Now, in FIG. 8, a carrier motor 32 for reciprocally moving the carrier 28 is carried on the carrier 28 itself. By a pinion 34 which is in meshing engagement with a rack 33 being rotated, the carrier 28 is moved along the rack 33. That is, as shown in FIG. 12, the pinion 34 integral with the motor shaft 32a of the motor 32 provided on the carrier 28 is rotated while meshing with the rack 33, and the carrier 28 is also moved to the left or right in conformity with the direction of revolution of the motor 32. Here, the rack 33, like the guide shaft 21, need be expanded or contracted, and in the shown example, the expansible and contractible rack 33 is constituted by a convex type tape line which can be taken up. Also, this rack 33, as shown in FIG. 12, is of structure in which meshing holes 35 are formed at a predetermined pitch in a strip plate (usually made of steel) whose cross-section is made arcuate for the prevention of buckling. So, as shown in FIG. 8, the strip plate constituting the rack 33 has its fore end coupled to the right side plate 18, and the base end portion thereof is coupled to the interior of a convex type case 36 fixed to the base 15 and is normally biased in the rolling-in direction by a spring (not shown) in the case 36. Thus, the rack 33 is paid away or taken up in conformity with the expansion or contraction of the cases 1 and 2.

Also, a support roller 37 is provided on the portion opposite to the portion of the carrier 28 fitted to the guide shaft 21, and this support roller 37 rolls on rails 38A and 38B laid on the upper surfaces of the bases 15 and 17 as the carrier 28 is moved. Accordingly, the carrier 28 is guided and supported by the guide shaft 21 and the rails 38A and 38B and can be properly reciprocally moved with a predetermined posture. An elongate cut-in is provided in the base 15 in side-by-side relationship with the rail 38A, and the rail 38B provided on the base 17 moves forward in this cut-in, and the upper surfaces of the rails 38A and 38B are equal in level.

Figure 13:
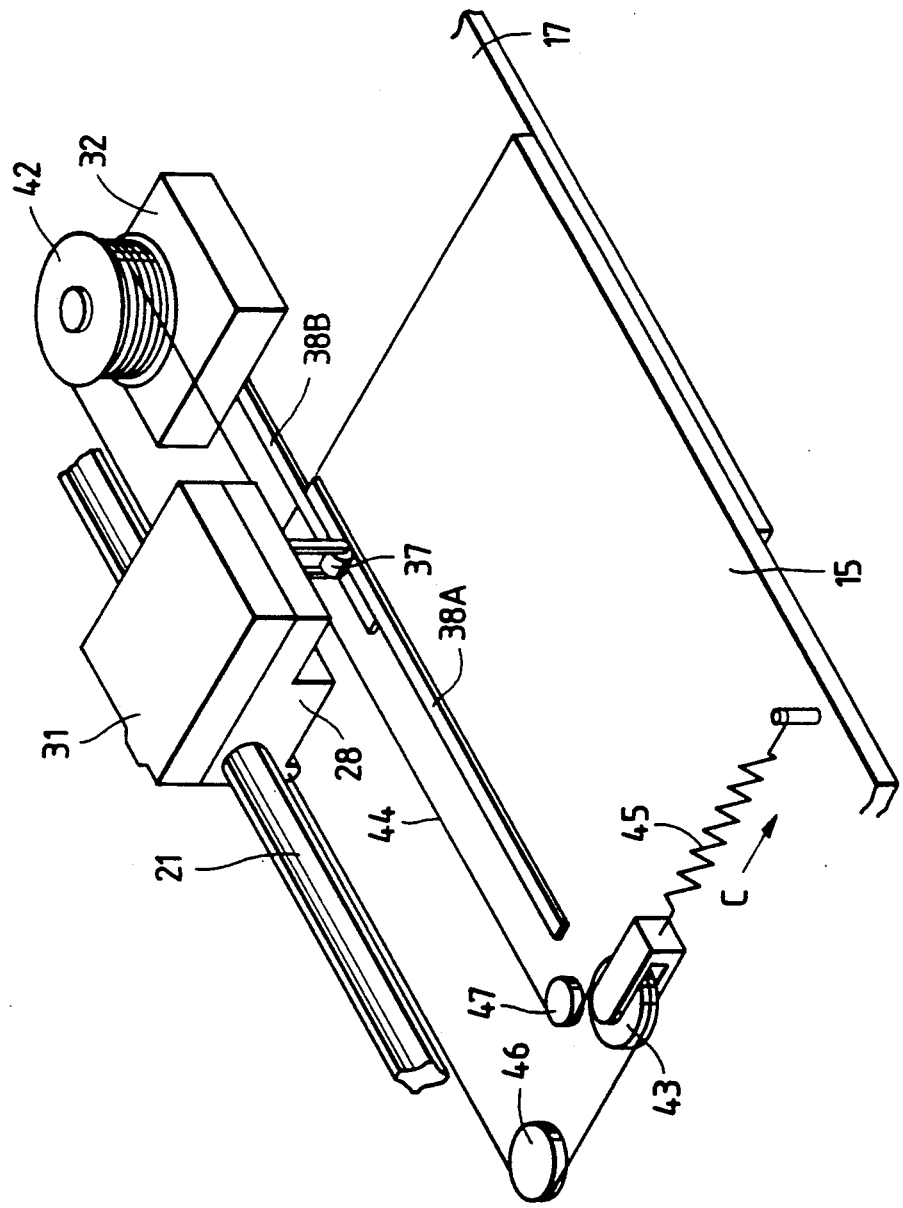
FIG. 13 is a perspective view showing a second example of the construction of the carrier driving device.
Figure 14:
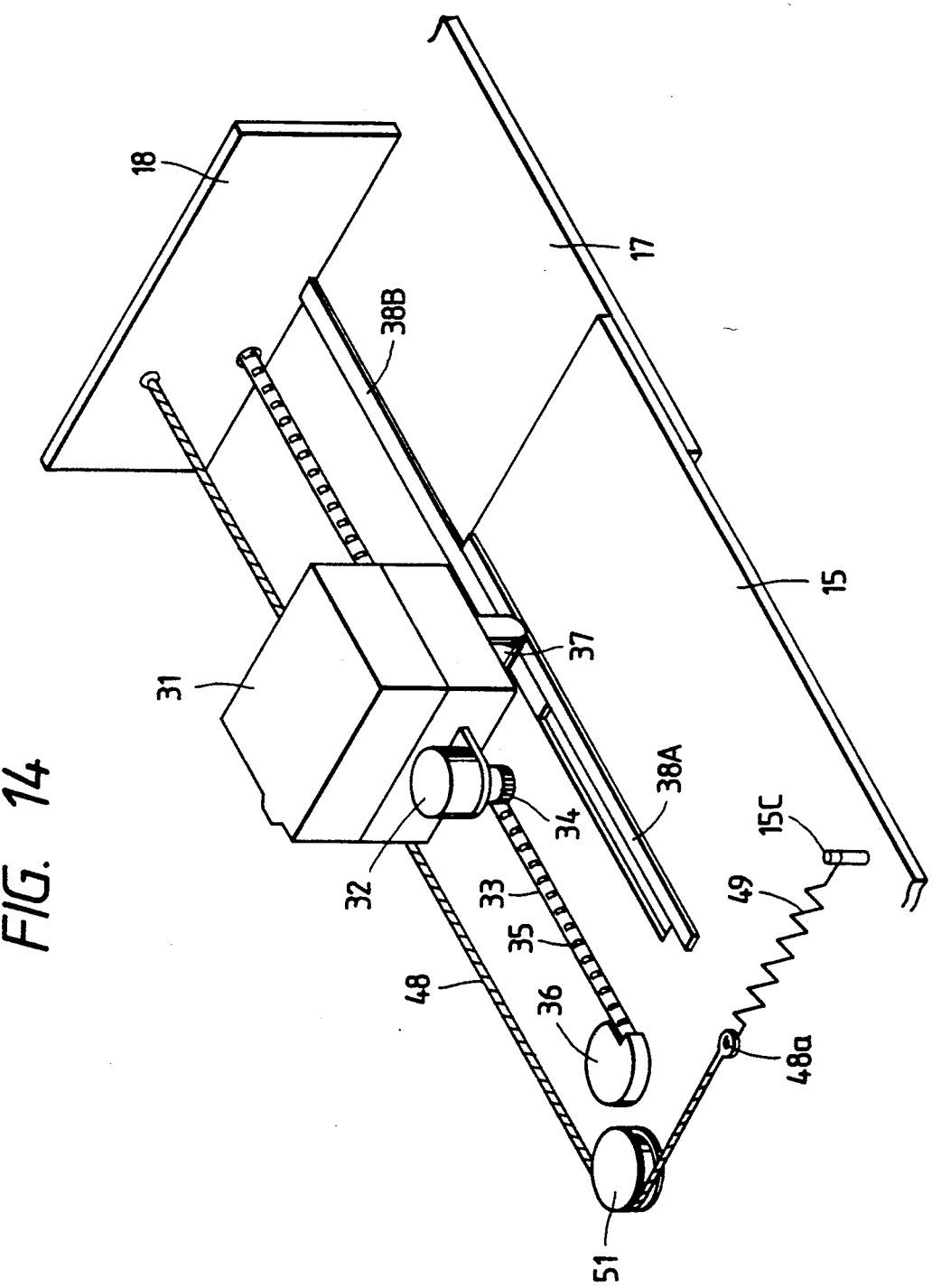
FIG. 14 is a perspective view showing a third example of the construction of the carrier driving device.
Figure 15:
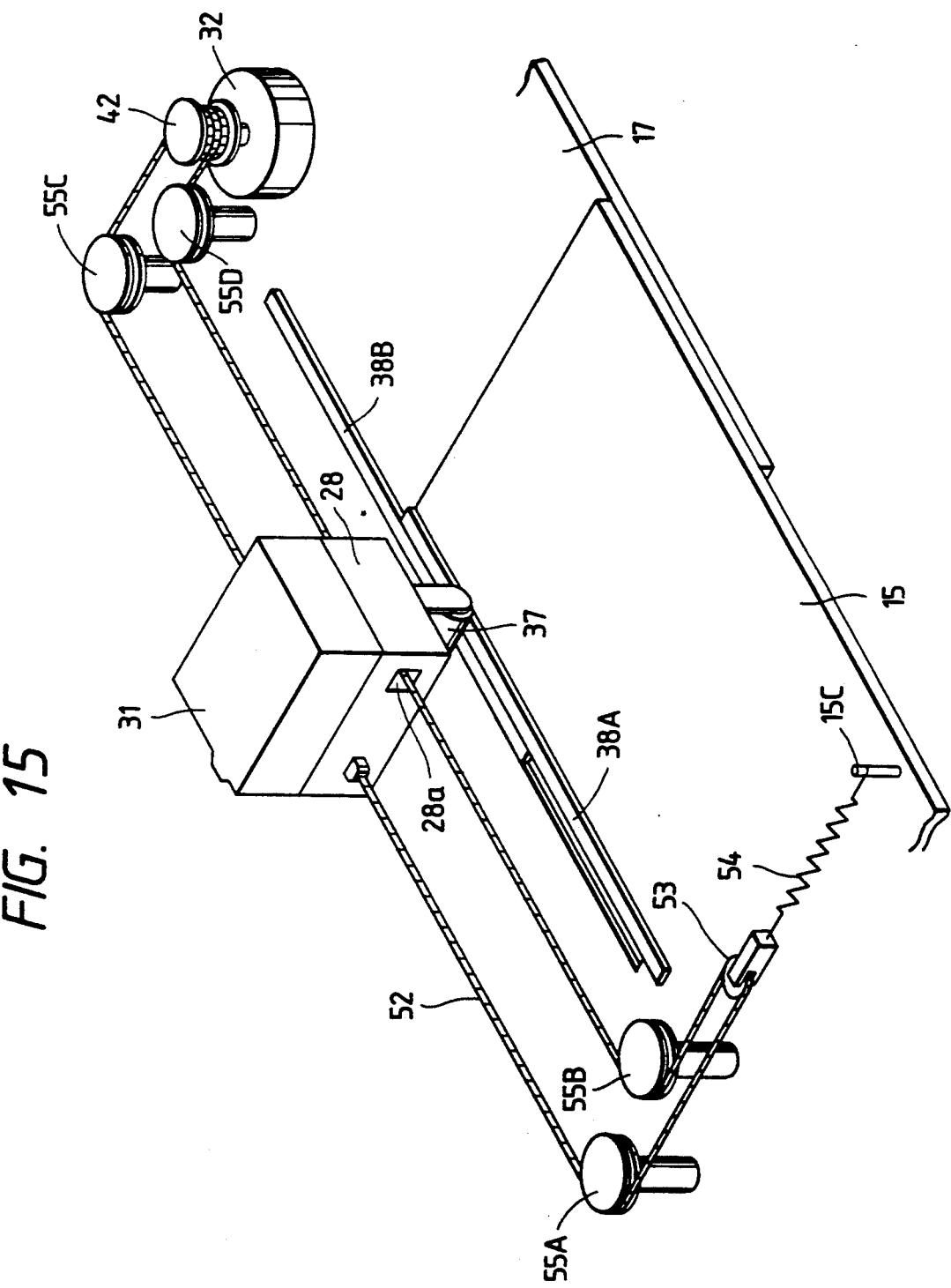
FIG. 15 is a perspective view showing a fourth example of the construction of the carrier driving device.

FIGS. 13 to 15 show second, third and fourth examples, respectively, of the construction of the driving device for the carrier 28.

In the second example shown in FIG. 13, the motor 32 for driving the carrier is fixed to the right base 17, and the carrier 28 may be driven through a wire 44 wound on a winding drum 42 rotatable by the motor 32 and a tension pulley 43 provided on the left base 15 and having its opposite ends coupled to the carrier 28. The tension pulley 43 is always biased in the direction of arrow C by a spring 45 having one end thereof connected to the base 15, and desired tension is always imparted to the wire 44. So, the spring 45 expands or contracts in conformity with the expansion or contraction of the cases 1 and 2 and therefore, the expansion or contraction of the cases 1 and 2 can be well coped with. The carrier 28 carrying thereon the recording head 31 with an ink tank, as in the case of the first example of the construction shown in FIG. 8, is guided and supported by the expansible and contractible guide shaft 21 and the rails 38A and 38B. The reference numerals 46 and 47 in FIG. 13 designate guide pulleys for guiding the wire 44.

In the third example shown in FIG. 14, a wire 48 having tension imparted thereto is used instead of the guide shaft 21 in FIG. 8. This wire 48 has one end thereof connected to the right side plate 18, and the other end thereof has a tensile force always imparted thereto by a spring 49 extended between it and the base 15. In the shown example, the intermediate portion of the wire 48 is guided by a guide pulley 51 supported on the base 15, and the spring 49 is connected between a pin 15C studded on the base 15 and the end portion 48a of the wire 48.

The carrier driving device shown in FIG. 14 differs from the carrier driving device in FIG. 8 in that it adopts a mechanism for guiding and supporting the carrier 28 by the above-described wire 48, instead of the guide shaft 21, but in the other points, it is substantially the same as the latter, and corresponding portions are given similar reference numerals and need not be described.

Again the construction shown in FIG. 14, predetermined tension is imparted to the wire 48 by the spring 49 and therefore, the range of movement of the carrier can be increased or decreased in conformity with the widthwise expansion or contraction of the recording apparatus, whereby the carrier 28 can be scanned and driven.

In the fourth example shown in FIG. 15, the motor 32 for driving the carrier is fixed to the right base 17, and a wire 52 for driving the carrier 28 is driven by the winding drum 42 rotatively driven by the motor 32. The wire 52 is connected at its opposite ends to the carrier 28 and is extended in an endless fashion. That is, the wire 52 wound on the winding drum 42 over a plurality of turns is connected to the opposite ends of the carrier 28 by way of a movable sheave (tension pulley) 53 provided on the left base 15, and by the movable sheave 53 being pulled by a spring 54 extended, between it and the pin 15C of the base 15, predetermined tension is always imparted to the wire 52 in spite of the expansion and contraction of the apparatus. The reference character 28a designates a passage hole through which the wire 52 passes. The reference characters 55A, 55B, 55C and 55D in FIG. 15 denote guide pulleys for changing the direction of movement of the wire 52.

Thus, in the carrier driving device shown in FIG. 15, the driving and guiding of the carrier 28 is accomplished by the wire 52. That is, the wire 52 of the above-described construction is used instead of the expansible and contractible guide shaft 21 and the convex type take-up rack 33 shown in FIG. 8.

The fourth example shown in FIG. 15 differs from the carrier driving device of FIG. 8 in the above-described points, but in the other points, it is substantially the same as the latter, and a support roller 37 adapted to roll on the rails 38A and 38B laid on the left and right bases 15 and 17 is supported on the carrier 28.

Again in the construction shown in FIG. 15, predetermined tension is always imparted to the wire 52 by the spring 54 and therefore, the range of movement of the carrier 28 can be increased or decreased in conformity with the widthwise expansion or contraction of the recording apparatus and the carrier 28 can be scanned and driven by the carrier motor 32.

Further, in the embodiment shown in FIG. 8, cap means 57 for sealing the ink discharge opening surface (the printing surface) of the recording head (the ink jet head) 31 when the carrier 28 comes to its left end home position is installed on the left base 15.

As shown in FIG. 8, the cap means 57 is comprised of a cap holder 59 slidably and pivotably supported on a guide pin 58 provided along the direction of movement of the carrier, a cap 61 of rubber-like elastic material attached to the front face (the face opposed to the printing surface of the recording head 31) of the cap holder 59, a spring 62 for biasing the cap holder 59 in the direction opposite to the home position (the rightward direction) and moreover in the direction in which the cap 61 is retracted (away from the head 31), and a cam 63 for prescribing the pivoted positions of the cap holder 59 (the spaced-apart and urged positions of the cap 61) in conformity with the sliding position of the cap holder 59.

The cap holder 59 is provided with a projection 65 for engaging a hook portion 64 provided on the home position side of the carrier 28 when the carrier comes close to the left end (the home position).

According to the above-described cap means 57, when the carrier 28 is moved to the left end, the hook 64 provided on the carrier 28 comes into engagement with the projection 65 and the cap holder 59 spring-biased rightwardly is moved along the guide pin 58. As the cap holder 59 is moved to the left, the cap 61 is moved (toward the head 31) by the shape of the cam 63 which is also a stop supporting portion, and is pivotally displaced in a direction to be urged against the printing surface of the head 31 (the surface having the ink discharge ports). Thus, with the movement of the carrier 28 to the home position, the printing surface of the recording head 31 is automatically sealed by the cap 61.

When the carrier 28 is moved rightwardly from the home position, the cap 61 is automatically separated from the head 31 by the movement opposite to that described previously.

Figure 16:
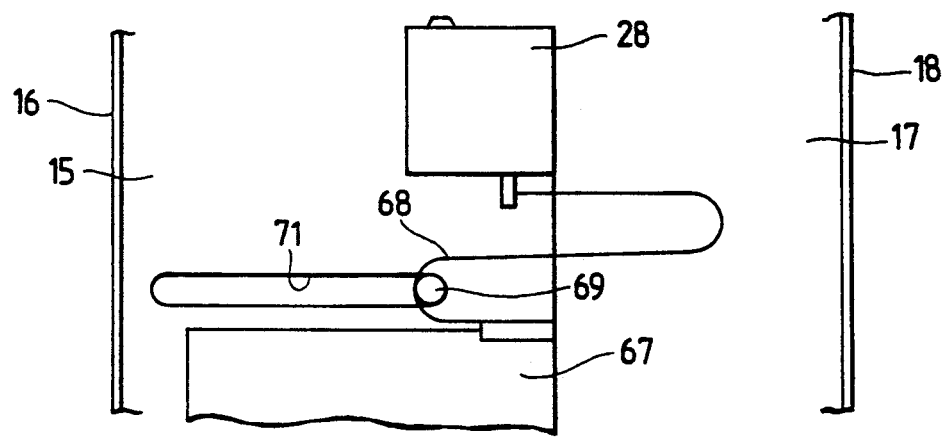
FIG. 16 is a schematic plan view of slack eliminating means for flexible wiring when extended.
Figure 17:
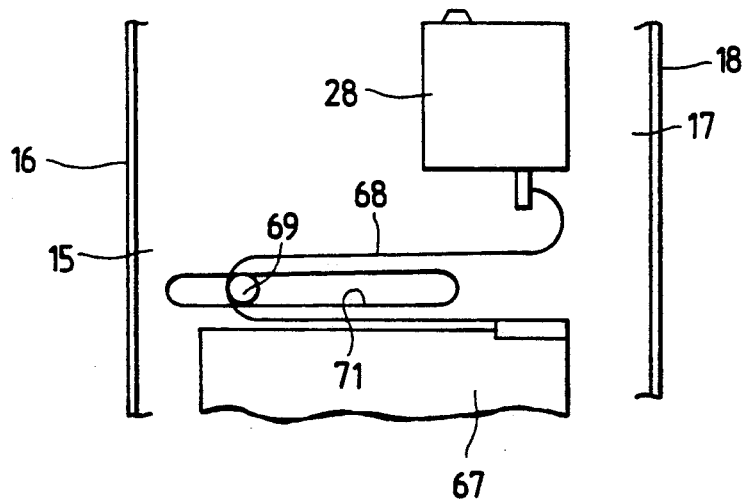
FIG. 17 is a schematic plan view of the means of FIG. 16 when reduced.

Furthermore, in the present embodiment, as shown in FIG. 8, a control base plate 67 for controlling the recording apparatus is mounted on the left base 15, and the electrical connection between the control base plate and the head driving circuit on the carrier 28 is made by a flexible cable 68. FIGS. 16 and 17 are schematic plan views showing the operation of guide (slack eliminating) means for the flexible cable 68 when the recording apparatus is expanded or contracted.

In FIGS. 8, 16 and 17, during the widthwise expansion or contraction, the right base 17 is moved relative to the carrier 28, and a projection 69 which is engaged with the intermediate portion of the flexible cable 68 and functions as a guide pin is studded on the base 17. The left base 15 is formed with a slot 71 for passing the projection 69 therethrough and permitting the movement thereof.

So, when the degree of expansion or contraction of the recording apparatus exceeds a predetermined level, the flexible cable 68 may contact with another member such as the recording mechanism or the frame member and be unnaturally curved, whereby during the movement of the carrier 28, the flexible cable may rub against or bite into other member and may be damaged thereby, but in the present embodiment, as shown in FIG. 17, when the recording apparatus is contracted, the flexible cable 68 is hauled in with the projection 69 as a guide pin and therefore, the flexible cable can be prevented from being caught or damaged.

Description will now be made of a mechanism for preventing the contraction of the apparatus body during non-capping.

The serial ink jet recording apparatus shown in FIG. 8 is designed such that the apparatus cannot be contracted to the minimum width (the contained state) shown in FIG. 3 or 7 unless the carrier 28 comes to the home position and the printing surface of the recording head 31 is sealed by the cap 61.

That is, if the power supply is cut off or interrupted during printing and the recording apparatus is contracted and brought into its non-use or custody state with the carrier 28 left stopped at other position than the home position, the ink discharge ports of the recording head 31 will be left in the atmosphere for a long time, and ink will be dried and the solid components thereof will adhere to the ink discharge ports or dust will adhere to the ink discharge ports to thereby make it very difficult to start the recording operation when printing is to be resumed. However, in the present embodiment shown in FIG. 8, design is made such that the recording apparatus can be contracted to the minimum width (the contained state) only when the carrier 28 is at the home position (the head cap position), whereby the above-noted problem of the ink discharge ports being clogged by their being exposed to the atmosphere for a long time can be solved.

Figure 18:
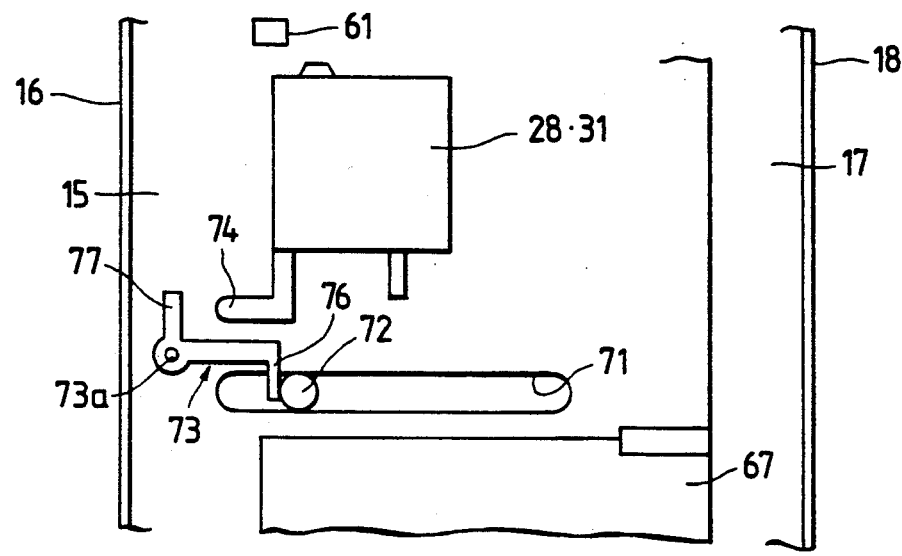
FIG. 18 is a schematic plan view showing the locked state of a lock mechanism.
Figure 19:
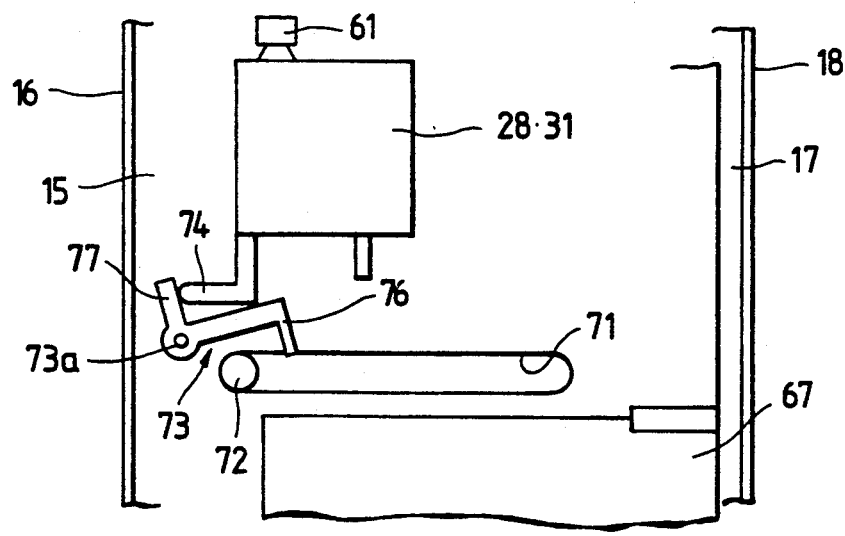
FIG. 19 is a schematic plan view showing the unlocked state of the lock mechanism of FIG. 18.

That is, FIG. 18 is a schematic plan view showing a state in which the recording head 31 is not capped and the recording apparatus cannot be contracted to the minimum width, and FIG. 19 is a schematic plan view showing a state in which the recording head 31 is capped and the recording apparatus is contracted to the minimum width.

As shown in FIGS. 8, 18 and 19, the slot 71 in the left base 15 is formed sufficiently long to the left position, and a lock pin 72 studded on the right base 17 extends through and is slidably fitted in the slot 71. On the other hand, at a position near the left end of the slot 71 in the left base 15, a bell-crank-like lock lever 73 is biased clockwise by a spring 75 and supported for pivotal movement about a shaft 73a. The lock lever 73 is normally caused to bear against a pin 73b by the spring 75, and the stopper portion 76 thereof is biased to a position for shielding the slot 71 (FIGS. 8 and 18).

On the other hand, the lock lever 73 is provided with an acting portion 77 for causing a pressing arm 74 to strike against the lock lever 73 and pivot the lock lever 73 to its opened position (FIG. 19) when the carrier 28 comes to the home position (the capping position).

Also, the pressing arm 74 for pivoting the lock lever 73 to its opened position is provided at the lower end of the carrier 28.

So, when the carrier 28 does not yet come to the home position and the head 31 is not capped, the stopper portion 76 of the lock lever 73 shields the slot 71 and regulates the movement of the lock pin 72 provided on the case 2 in the direction to contract the apparatus body, whereby the case is prevented from being contracted to a predetermined width (e.g., the custody width). Accordingly, it can be prevented that the apparatus is put into custody without the head 31 being capped. On the other hand, when the carrier 28 comes to the home position and the head 31 is capped, the arm 74 bears against the acting portion 77 to pivot the lever 73 counter-clockwise and therefore, the stopper portion 76 is retracted from the shielding position in which it shields the slot 71, whereby the stopper portion does not interrupt the movement of the case 2 in the direction to contract. Accordingly, when the head 31 is capped, the apparatus can be made compact for custody.

The lock pin 72, the lock lever 73 and the pressing arm 74 as described above together constitute a forget-to-cap preventing mechanism which is provided with a stop member 76 released by the movement of the ink jet head (recording head) 31 on the carrier 28 returning to the cap position and in which when the ink jet head 31 is at a position off the cap position, the lock pin 72 is stopped by the stop member (stopper portion) 76 as shown in FIG. 18 to thereby prevent the contracting operation of the recording apparatus.

A sheet width sensor will now be described.

As described above, in the present embodiment, in FIG. 8, the sheet width sensor 41 installed on the right base 17 constitutes width detecting means for electrically detecting the degree of expansion or contraction, i.e., the widthwise dimension, of the recording apparatus.

This sheet width sensor 41 is provided within the range of scanning of the carrier 28, and is connected to a control circuit so as to be operated by suitable means such as optical or magnetic means when the carrier 28 has been scanned (moved), and detect the range of reciprocal movement of the carrier 28, i.e., the widthwise dimension (the degree of expansion or contraction) of the recording apparatus, from the position of the carrier 28 during this operation.

In other words, it is designed so as to be capable of calculating the widthwise dimension from the timing of the detection signal transmitted from the sheet width sensor 41 to the control circuit on the control base plate 67 and the position information of the carrier 28 by a program.

According to such a sheet width sensor (width detecting means) 41, the sheet width designating operation by the operator can be eliminated and the control of the margin setting and print format setting of the carrier 28 conforming to the expansion or contraction of the recording apparatus body also becomes possible.

Figure 20:
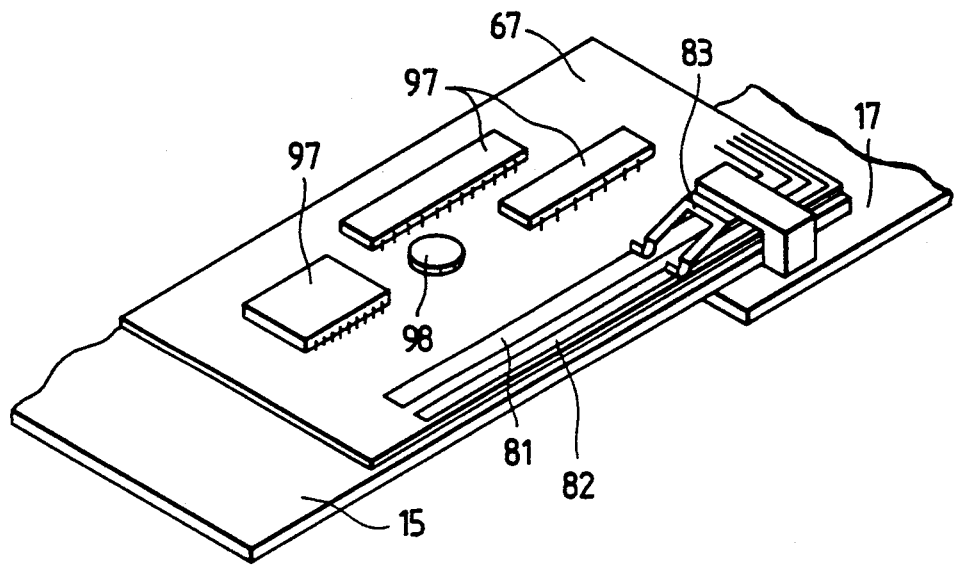
FIG. 20 is a perspective view showing a second example of the construction of width detecting means.
Figure 21:
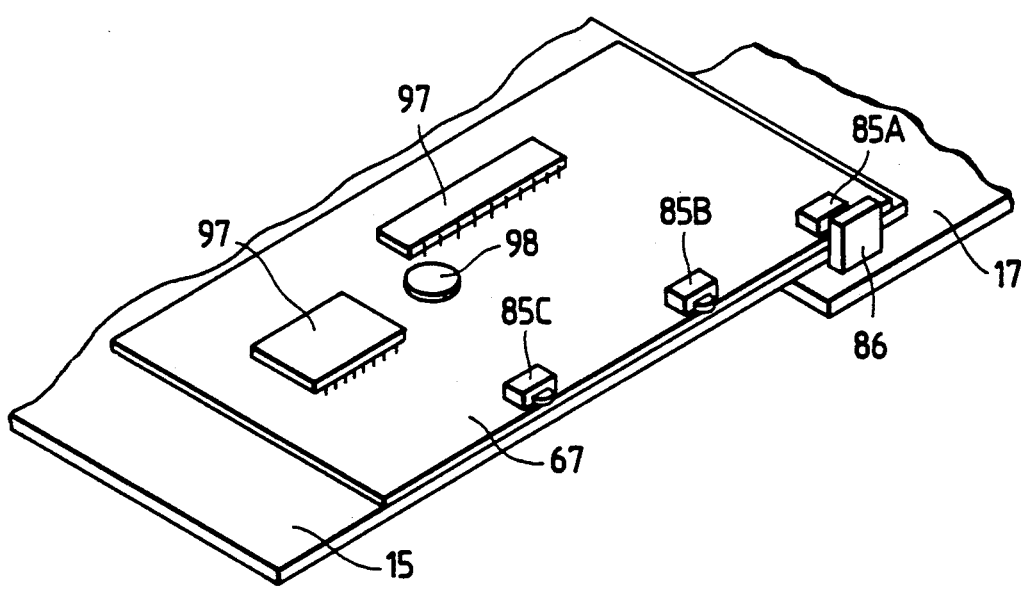
FIG. 21 is a schematic plan view showing a third example of the construction of the width detecting means.

FIGS. 20 and 21 are fragmentary perspective views showing second and third examples, respectively, of the construction of width detecting means replacing the above-described sheet width sensor 41.

In the second example shown in FIG. 20, width detecting means is constituted by a resistor pattern 81 and a common pattern 82 provided on the control base plate 67 of the left base 15 and a leaf-spring-like contact 83 mounted on the right base 17 and slidable on said patterns 81 and 82.

According to the width detecting means shown in FIG. 20, the widthwise dimension (the degree of expansion or contraction) of the recording apparatus can be steplessly detected by a variation in the resistance value when said contact 83 is slid on said resistor pattern 81 in synchronism with the expansion or contraction of the recording apparatus (or the cases 1 and 2 thereof).

In the third example of the construction of the width detecting means shown in FIG. 21, a plurality of push button type switches 85A, 85B and 85C are provided at predetermined intervals on the control base plate 67 on the left base 15, and a pressing piece 86 disposed so as to press the plurality of switches 85A, 85B and 85C in succession in response to the expansion or contraction is provided on the right base 17, and these switches and pressing piece together constitute the width detecting means (the sensor for detecting the degree of expansion or contraction).

Thus, there is provided the step detection type width detecting means constituted by the plurality of switches 85A, 85B and 85C operated by the expansion or contraction of the cases 1 and 2.

According to the width detecting means shown in FIGS. 20 and 21, the print format setting (the margin setting) during recording can also be controlled at the same time by only the expansion or contraction without the sheet width being designated and in addition, extra wiring and members therefor become unnecessary and curtailment of the space and reduction in the cost can be achieved because a detection signal generating unit is disposed by the utilization of the control plate 67. The reference numeral 97 designates a transistor such as a memory, CPU or IO, and the reference numeral 98 denotes a buzzer which generates various kinds of alarms.

Figure 22:
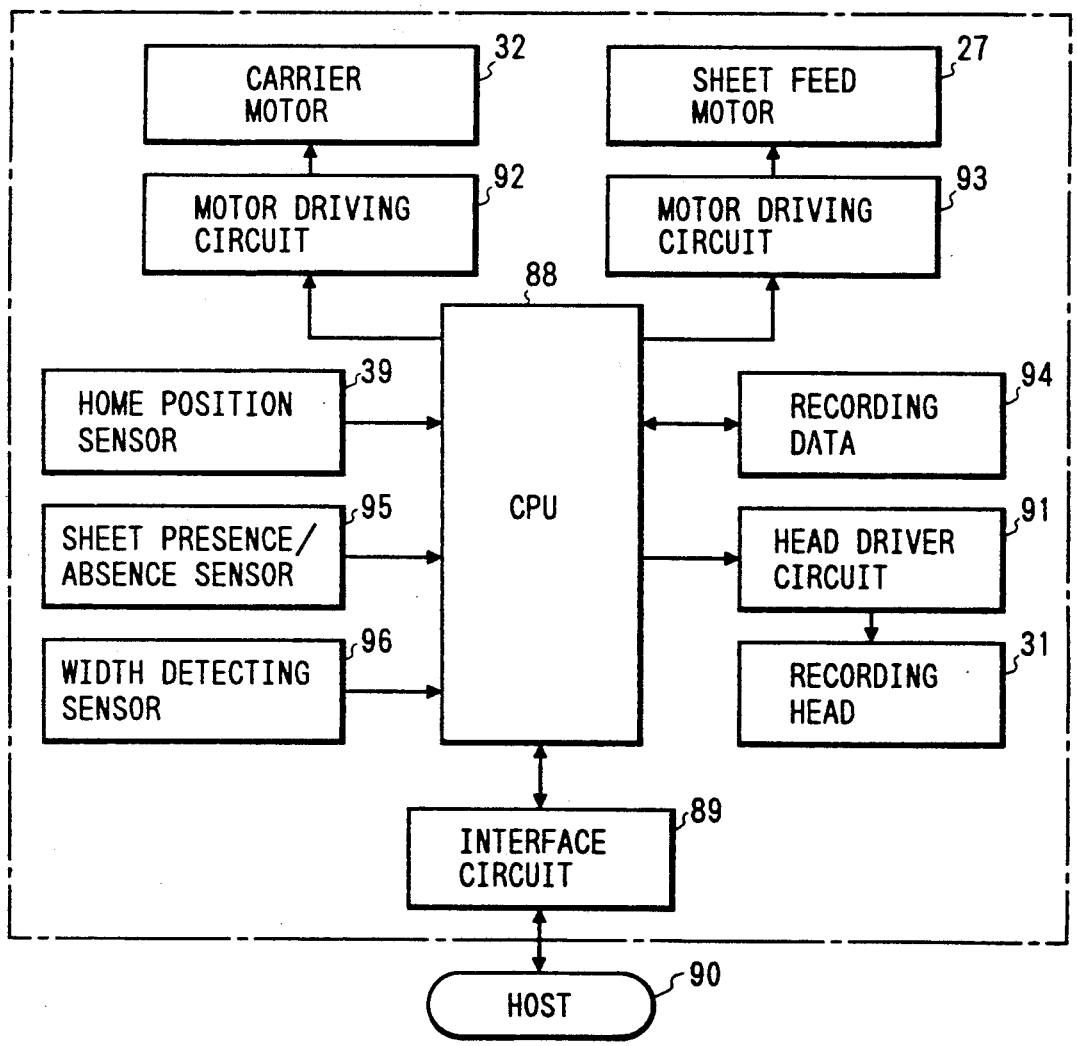
FIG. 22 is a block diagram of the control system of the recording apparatus of FIG. 8.

FIG. 22 is a block diagram of the control system of the above-described serial recording apparatus of the present invention capable of expansion and contraction.

In FIG. 22, the central processing circuit (the control circuit) 88 of the recording apparatus is connected to a host 90 through an interface circuit 89, receives command information and recording data, drives the recording head 31 through a head driver circuit 91, drives the carrier motor 32 through a motor driving circuit 92, and further drives the sheet feed motor 27 through a motor driving circuit 93.

A memory unit (RAM) 94 storing the recording data therein is connected to the control circuit 88, and further, the reference position detection signal of the carrier 28 is input from the home position sensor 39 to the control circuit 88, the sheet presence/absence detection signal of the recording sheet 6 is input from a sheet sensor 95 to the control circuit 88, and a carrier margin detection signal is input from width detecting means 96 comprising the sheet width sensor 41 or the like to the control circuit 88, and the recording operation is controlled on the basis of these detection signals.

Figure 23:
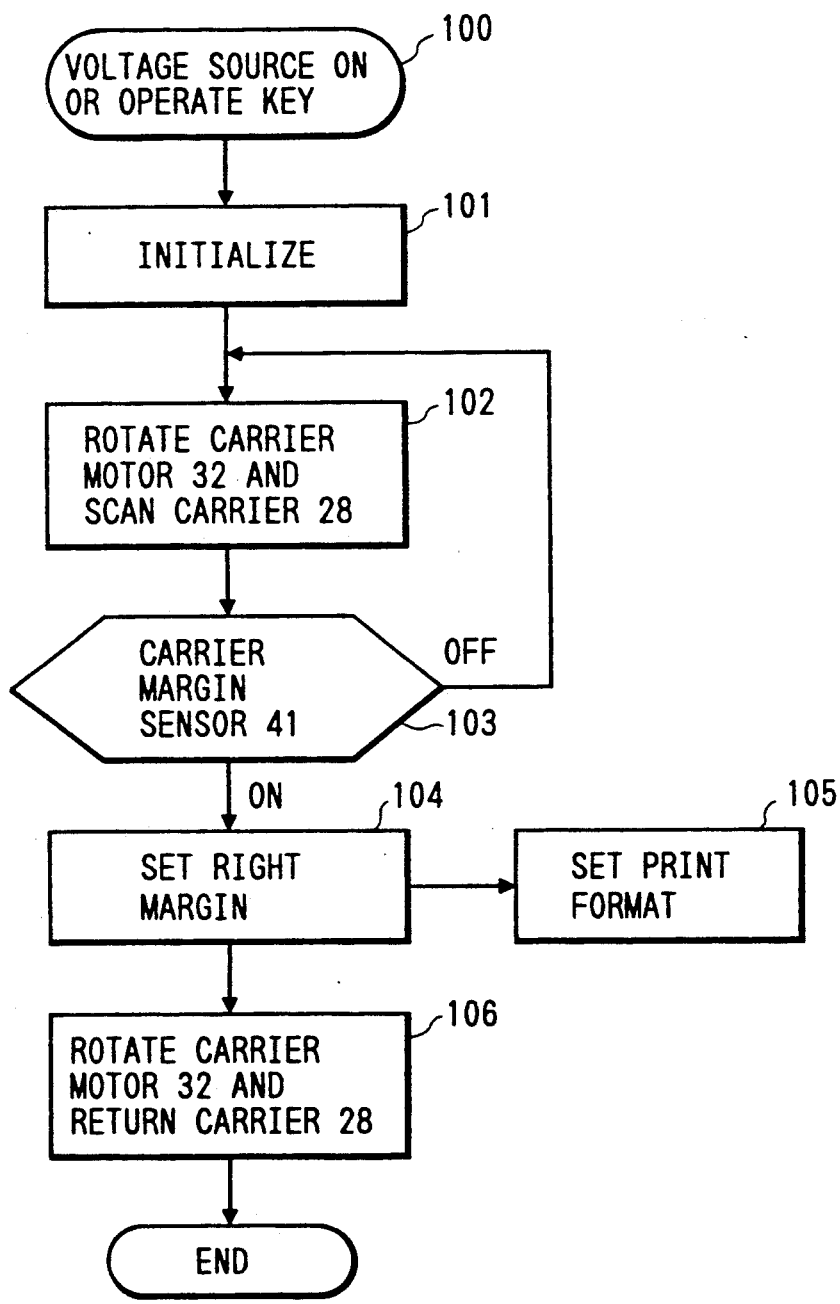
FIG. 23 is a flow chart of the margin setting operation of the control system of FIG. 22.

FIG. 23 is a flow chart of the margin setting operation of the carrier 28 by the control system of FIG. 22.

In FIG. 23, at step 100, the voltage source switch is closed or the key is operated, whereby at step 101, initialization is effected, whereafter at step 102, the carrier motor 32 is driven to move the carrier 28.

While this movement of the carrier 28 is being effected, at step 103, whether the carrier margin sensor (width detecting means) 96 has become ON is discriminated.

If the carrier margin sensor 96 is OFF, return is made to the step 102, where the movement of the carrier 28 is continued.

When the carrier margin sensor 96 has become ON, advance is made to step 104, where the right-hand margin of the carrier 28 is set, and at step 105, a print format is set.

Simultaneously therewith, at step 106, the carrier motor 32 is driven to return the carrier 28 (usually to the home position), and the margin setting of the carrier 28 is completed.

As is apparent from the foregoing description, according to the present embodiment, there is provided a serial recording apparatus having a recording mechanism within cases and wherein the cases, the guide shaft of the carrier and the shaft of the sheet feed roller are expanded or contracted in the direction of movement of the carrier to thereby increase or decrease the widthwise dimension and therefore the installation space during non-use can be reduced and the installation space during use can also be set to the necessary minimum in conformity with the sheet width and which is thus excellent in space efficiency.

While the present invention has been described with respect to an ink jet recording apparatus in which an ink stream is discharged to accomplish recording, the present invention is not restricted thereto, but is also suitably applicable, for example, to the so-called heat transfer recording system or the so-called thermosensitive recording system.

As described above, the present invention provides a recording apparatus whose size can be varied.

We claim:

1. A recording apparatus for recording on a recording medium, said recording apparatus comprising:
   recording means for recording in a recording direction on a recording medium;
   conveying means for conveying the recording medium;
   a first and a second case containing said recording means and said conveying means; and
   means for relatively moving said first and second cases in a direction substantially parallel to the recording direction between at least a first position for recording on a recording medium of a first predetermined size and a second position for recording on a recording medium of a second predetermined size, wherein the size of said apparatus when said cases are at the second position is smaller than the size of said apparatus when said cases are at the first position.

2. A recording apparatus according to claim 1, wherein said recording means is reciprocally movable along said conveying means, and a guide shaft for guiding said recording means during the reciprocal movement thereof is variable in length.

3. A recording apparatus according to claim 1, wherein said conveying means has a shaft variable in length and a sheet feed roller supported on said shaft.

4. A recording apparatus according to claim 2, further including a drive shaft rotatable by a drive force from a motor.

5. A recording apparatus for recording on a recording medium, said recording apparatus comprising:
   recording means for recording on the recording medium;
   conveying means for conveying said recording medium;
   first and second cases for containing said recording means and said conveying means; and
   means for said first case and said second case to be relatively movable, wherein a shaft capable of expansion and contraction is supported by left and right supporting portions having the spacing therebetween variable in conformity with the relative movement of said cases, a sheet feed roller is fixed to the opposite end portions of said shaft, and a sheet keeping member is mounted on said left and right supporting portions.

6. A recording apparatus for recording on a recording medium, said recording apparatus comprising:
   recording means for recording on the recording medium;
   conveying means for conveying said recording medium;
   first and second cases for containing said recording means and said conveying means; and
   means for said first case and said second case to be relatively moveable, wherein a projection adapted to engage an intermediate portion of a flexible cable connected between a base of said recording apparatus and a carrier is provided, and said flexible cable is hauled in by said projection during the contraction of said cases.

7. A recording apparatus for recording on a recording medium, said recording apparatus comprising:
   recording means for recording in a recording direction on the recording medium;
   conveying means for conveying the recording medium;
   first and second cases for containing said recording means and said conveying means; and
   means for said first case and said second case to be relatively movable in a direction substantially parallel to the recording direction, wherein at least one of a connector and a switch is mounted on one of said cases and when the widthwise dimension of said cases in the recording direction is at a minimum at least one of the connector and the switch mounted on one of said cases is covered with the other of said cases.

8. A recording apparatus for recording on a recording medium, said recording apparatus comprising:
   recording means for recording in a recording direction on the recording medium;
   conveying means for conveying the recording medium;
   first and second cases for containing said recording means and said conveying means; and means for said first case and said second case to be relatively movable in a direction substantially parallel to the recording direction, wherein an opening-closing member is mounted on said cases for rotational movement about an axis parallel to the direction of relative movement of said cases and for sliding movement in the direction of relative movement, a sheet supporter for supporting the recording sheet is constituted by said opening-closing member when brought to an opened state, and a cover on said cases is constituted by said opening-closing member when brought to a closed state.

9. A recording apparatus for recording on a recording medium, said recording apparatus comprising:
recording means for recording in a recording direction on the recording medium;
conveying means for conveying the recording medium;
first and second cases for containing said recording means and said conveying means; and
means for said first case and said second case to be relatively moveable in a direction substantially parallel to the recording direction, wherein when the widthwise dimension in the recording direction of said cases approaches a vicinity of a minimum thereof, a main switch is opened in response to the relative movement of said cases.

10. A recording apparatus for recording on a recording medium, said recording apparatus comprising:
recording means for recording on the recording medium;
conveying means for conveying said recording medium;
first and second cases for containing said recording means and said conveying means; and
means for said first case and said second case to be relatively moveable, further comprising a moving means and a carrier means, said moving means for moving the carrier means and said carrier means for carrying said recording means, wherein said moving means comprises a motor having a pinion provided on said carrier, and a rack comprising a strip plate of arcuate cross-section shape formed with meshing holes at a predetermined pitch.

11. A recording apparatus according to claim 3, wherein said shaft is a drive shaft rotatable by a drive force from a motor.

12. A recording apparatus for recording on a recording medium, said recording apparatus comprising:
recording means for recording on the recording medium;
conveying means for conveying said recording medium;
first and second cases for containing said recording means and said conveying means; and
means for said first case and said second case to be relatively moveable, wherein said conveying means has a shaft variable in length and a sheet feed roller supported on said shaft, said shaft being capable of expansion and contraction and supported by left and right supporting portions having the spacing therebetween variable in conformity with the relative movement of said cases, said sheet feed roller being fixed to opposite end portions of said shaft, and a sheet keeping member mounted on said left and right supporting portions.

13. A recording apparatus according to claim 1, wherein said recording means has discharge ports for causing ink droplets to fly.

14. A recording apparatus for recording on a recording medium, said recording apparatus comprising:
recording means for recording in a recording direction on the recording medium;
conveying means for conveying said recording medium;
a first and a second case for containing said recording means and said conveying means;
means for said first case and said second case to be relatively moveable in a direction substantially parallel to the recording direction; and
detecting means for detecting the spacing between said first and said second case.

15. A recording apparatus according to claim 14, wherein said detecting means is provided within the range of scanning of a carrier, and said detecting means is operated by the scanning of said carrier.

16. A recording apparatus for recording on a recording medium, said recording apparatus comprising:
recording means for recording on the recording medium;
conveying means for conveying said recording medium;
a first and a second case for containing said recording means and said conveying means;
means for said first case and said second case to be relatively moveable; and
detecting means for detecting the spacing between said first case and said second case, said detecting means having a resistor pattern and a contact slidable on said pattern, and wherein the spacing of said cases is detected on the basis of the amount of variation in the resistance value when said contact is slid on said resistor pattern in synchronism with the expansion or contraction of said cases.

17. A recording apparatus according to claim 15, wherein said detecting means is comprised of a plurality of switches operated by the expansion or contraction of said cases in the recording direction.

18. An ink jet recording apparatus for discharging ink to thereby record on a recording medium, said ink jet recording apparatus comprising:
a recording head having a plurality of discharge ports for discharging the ink therethrough;
a cap means for covering the discharge ports of said recording head at a capping position;
first and second cases for containing said recording head and cap means, said first and second cases being relatively movable; and
a stop member for preventing movement of said first and second cases toward each other, said stop member adapted to be released in response to the movement of said recording head to said capping position.

19. A serial recording apparatus comprising two cases housing a recording mechanism, the recording mechanism including a carrier for moving a recording head in a predetermined direction, the carrier having a guide shaft, and a sheet feed roller for feeding recording sheets, the sheet feed roller having a rotary shaft, wherein the widthwise dimension of said apparatus is increased or decreased by relative movement of said cases, the guide shaft of the carrier and the rotary shaft of the sheet feed roller being expanded or contracted in the direction of movement of said carrier with the relative movement of said cases.

20. A recording apparatus for recording on a recording medium, said recording apparatus comprising:
recording means for recording in a recording direction on the recording medium;
conveying means for conveying the recording medium;
first and second cases for containing said recording means and said conveying means; and
means for said first case and said second case to be relatively moveable in a direction substantially parallel to the recording direction, wherein said conveying means has a shaft variable in length and a sheet feed roller supported on said shaft, said shaft is a drive shaft rotatable by a drive force from a motor, and said recording means comprises discharge ports for causing ink droplets to fly.

21. An apparatus according to claim 1, wherein said recording means comprises an ink jet recording head for discharging an ink droplet from a discharge port to record.

22. An apparatus according to claim 1, wherein the first position is a recording position and the second position is an accommodating position.

23. An apparatus according to claim 1, wherein said first and second cases are cooperatively capable of covering said recording means and said conveying means.

24. An apparatus according to claim 1, wherein said recording means comprises a recording head capable of reciprocally moving along a conveyance route.

25. A recording apparatus according to claim 5, wherein said recording means comprises an ink jet recording head for discharging ink droplets from a discharge port to record.

26. A recording apparatus according to claim 6, wherein said recording means comprises an ink jet recording head for discharging ink droplets from a discharge port to record.

27. A recording apparatus according to claim 7, wherein said recording means comprises an ink jet recording head for discharging ink droplets from a discharge port to record.

28. A recording apparatus according to claim 8, wherein said recording means comprises an ink jet recording head for discharging ink droplets from a discharge port to record.

29. A recording apparatus according to claim 9, wherein said recording means comprises an ink jet recording head for discharging ink droplets from a discharge port to record.

30. A recording apparatus according to claim 10, wherein said recording means comprises an ink jet recording head for discharging ink droplets from a discharge port to record.

31. A recording apparatus according to claim 12, wherein said recording means comprises an ink jet recording head for discharging ink droplets from a discharge port to record.

32. A recording apparatus according to claim 14, wherein said recording means comprises an ink jet recording head for discharging ink droplets from a discharge port to record.

33. A recording apparatus according to claim 16, wherein said recording means comprises an ink jet recording head for discharging ink droplets from a discharge port to record.

34. An ink jet recording apparatus according to claim 18, wherein said recording head comprises an ink jet recording head for discharging ink droplets from the discharge ports to record.

35. A serial recording apparatus according to claim 19, wherein said recording head comprises an ink jet recording head for discharging ink droplets from a discharge port to record.

36. A recording apparatus according to claim 20, wherein said recording means comprises an ink jet recording head for discharging ink droplets from a discharge port to record.

* * * * *

UNITED STATES PATENT AND TRADEMARK OFFICE
CERTIFICATE OF CORRECTION

PATENT NO. : 5,105,210
DATED : April 14, 1992
INVENTOR(S) : HIRANO ET AL.

It is certified that error appears in the above-identified patent and that said Letters Patent is hereby corrected as shown below:

On the Cover Page:

Insert -- [30] FOREIGN APPLICATION PRIORITY DATA
        May 18, 1988 [JP] Japan......63-121446
        May 18, 1988 [JP] Japan......63-121447
        May 18, 1988 [JP] Japan......63-121448
        May 18, 1988 [JP] Japan......63-121449
        May 18, 1988 [JP] Japan......63-121450
        May 18, 1988 [JP] Japan......63-121451
        May 18, 1988 [JP] Japan......63-121452
        May 18, 1988 [JP] Japan......63-121453
        June 27, 1988 [JP] Japan......63-158323--.

COLUMN 3:

Line 28, "rail 1C" should read --rail 1c--.

COLUMN 4:

Line 28, "size as" should read --size, as--;
    Line 68, "13 provided" should read --13a provided--.

UNITED STATES PATENT AND TRADEMARK OFFICE
CERTIFICATE OF CORRECTION

PATENT NO.  :   5,105,210                 Page 2 of 2
DATED       :   April 14, 1992
INVENTOR(S) :   HIRANO ET AL.

It is certified that error appears in the above-identified patent and that said Letters Patent is hereby corrected as shown below:

COLUMN 5:

Line 15, "groove 13" should read --groove 13a--.

COLUMN 6:

Line 59, "widthwisely" should read --widthwise--.

COLUMN 7:

Line 56, "need be" should read --needs to be--.

COLUMN 9:

Line 6, "extended," should read --extended--.

COLUMN 10:

Line 28, "other" should read --the other--.

Signed and Sealed this

Seventh Day of September, 1993

Attest:

BRUCE LEHMAN

*Attesting Officer*        *Commissioner of Patents and Trademarks*